United States Patent [19]

Brünle

[11] Patent Number: 5,103,220
[45] Date of Patent: Apr. 7, 1992

[54] METHOD OF EXPANDING A THREE-STAGE REGULAR SWITCHING ARRAY

[75] Inventor: Siegfried Brünle, Esslingen, Fed. Rep. of Germany

[73] Assignee: ANT Nachrichtentechnik GmbH, Backnang, Fed. Rep. of Germany

[21] Appl. No.: 526,005

[22] Filed: May 21, 1990

[30] Foreign Application Priority Data

May 23, 1989 [DE] Fed. Rep. of Germany ....... 3916720

[51] Int. Cl.⁵ .................... H04Q 1/00; H04Q 3/00; H04M 3/00; H04M 5/00
[52] U.S. Cl. .................... 340/825.8; 340/826; 379/271; 370/16; 371/11.1
[58] Field of Search .................... 340/827, 826, 825.8; 379/273, 272, 271; 370/16; 371/8.1, 11.1

[56] References Cited

U.S. PATENT DOCUMENTS

| | | | |
|---|---|---|---|
| 3,593,295 | 7/1971 | Joel | 379/272 |
| 3,674,938 | 7/1972 | Jacob | 340/825.8 |
| 4,536,870 | 8/1985 | Bovo et al. | 370/16 |
| 4,754,478 | 6/1988 | Leibersberger et al. | 379/271 |
| 4,811,333 | 3/1989 | Rees | 340/825.8 |
| 4,964,105 | 10/1990 | Schrodt et al. | 371/8.1 |

FOREIGN PATENT DOCUMENTS

| | | |
|---|---|---|
| 1130482 | 4/1964 | Fed. Rep. of Germany . |
| 2424727 | 4/1975 | Fed. Rep. of Germany . |
| 0082150 | 4/1988 | Japan ....... 340/827 |
| 0291560 | 11/1989 | Japan ....... 340/827 |

OTHER PUBLICATIONS

A Study of Non-Blocking Switching Networks; Charles Clos Bell System Technology Journal, vol. 32, pp. 406-424, 1953.

Primary Examiner—Donald J. Yusko
Assistant Examiner—Brian Zimmerman
Attorney, Agent, or Firm—Spencer, Frank & Schneider

[57] ABSTRACT

A method of expanding a regular three-stage switching array. Original switching blocks of the first and third stages having a smaller number of crosspoints are enlarged to switching blocks having a larger number of crosspoints, by combining the original switching blocks. In addition, the three stages are expanded by adding additional switching blocks. After the enlarged blocks are formed, at least one additional block is added to the second stage, and some of the connection paths between the enlarged blocks and the blocks of the second stage are rerouted to the additional blocks. The rerouting is performed for the original blocks of the second stage one at a time. In order to avoid disruption of operations during the expansion, while the rerouting is being performed for any particular original block of the second stage, the connections between that original block and the enlarged blocks which would otherwise be established, are switched through redundant connection paths in the second stage. When the rerouting for the original block is complete, these connections are switched back to the connection paths of the original and added blocks of the second stage. After repeating the above for all original blocks of the second stage, the outputs of additional blocks of the first stage and the inputs of additional blocks of the third stage are respectively connected with the inputs and outputs that are still free in the now existing original and additional blocks of the second stage.

8 Claims, 5 Drawing Sheets

1

METHOD OF EXPANDING A THREE-STAGE REGULAR SWITCHING ARRAY

REFERENCE TO RELATED APPLICATIONS

This application claims the priority of Federal Republic of Germany application Serial No. P 39 16 720.8 filed May 23rd, 1989, which is incorporated herein by reference.

BACKGROUND OF THE INVENTION

The present invention relates to a method of expanding a regular three-stage switching array wherein the size of switching blocks in the first and third stages is expanded in such a manner that at least two switching blocks are combined in each of the first and third stages to form one larger switching block, and wherein additional switching blocks are added to each of the three stages.

With an increased demand for connections to be switched through, switching arrays must be expanded. A three-stage switching array that can be expanded to an unlimited extent is known from Federal Republic of Germany Patent No. 2,803,065. In this case, switching matrices (hereinafter referred to as switching blocks) in all three stages are expanded. The expansion requires considerable preliminary work, i.e. at a stage in which the extent of expansion cannot even be foreseen, switching blocks must be provided with blind connections. In addition, the switching array is not non-blocking. The same applies for expansion of the switching array according to Federal Republic of Germany Patent No. 1,130,482, which involves only a two-stage array. Federal Republic of Germany Offenlegungsschrift DE-OS 2,424,727 discloses a switching array which is expanded at considerable additional expense via parallel switching blocks.

Moreover, it has been proposed in the inventor's Federal Republic of Germany patent application P 39 06 545.6, filed Mar. 2nd, 1989, the disclosure of which is incorporated herein by reference, to gradually replace the switching blocks in the first and third stages or in the second stage by larger switching blocks. During each replacement of a switching block, the block is disconnected in steps via a redundant block.

SUMMARY OF THE INVENTION

It is an object of the present invention to provide an improved method of expanding a regular three-stage switching array wherein the size of the switching blocks in the first and third stages is expanded in that at least two switching blocks in each of the first and third stages are combined to form one larger switching block and wherein the first, second and third stages are expanded by additional switching blocks. It is a further object of the invention to provide such a method according to which the expense for the additional switching blocks for expansion remains as low as possible.

These objects are accomplished according to the method of the invention, by expanding a regular non-blocking three-stage switching array by enlarging the size of the switching blocks in the first and third stages by combining at least two original switching blocks of the first and third stages to form expanded switching blocks, and by adding at least one additional switching block to the second stage, with the number of inputs of the additional switching block or switching blocks being at least equal to the number of the enlarged switching blocks in the first stage. Thereafter, some of the connection paths between the enlarged switching blocks of the first and third stages and the original switching blocks of the second stage are rerouted to the additional switching blocks of the second stage. The rerouting is performed for each original block of the second stage in succession with the number of connections rerouted for each switching block of the second stage being equal to the difference between the number of original switching blocks and the number of enlarged switching blocks in the first stage.

While the rerouting is being performed for any particular original switching block of the second stage, redundant connection paths are provided in the second stage for the connections between that original switching block of the second stage and the enlarged blocks of the first and third stages. When the rerouting for an original switching block of the second stage is complete, these connections are switched back from the redundant paths to the connection paths of the original and added switching blocks. After repeating the above for all of the original primary switching blocks of the second stage, the outputs of additional switching blocks added to the first stage and the inputs of additional switching blocks added to the third stage are connected respectively with the inputs and outputs that are still free in the now existing switching blocks in the second stage (both original and additional).

The method according to the present invention has the following advantages:

expansion takes place during operation of the switching array without impairment of operations since alternate connections are made during the expansion, via redundant connection paths;

if small switching arrays are constructed of relatively large switching blocks or modules, few switching blocks are necessary in the second stage;

the danger of faulty switching even during expansion is reduced by the systematic and regular wiring of the switching blocks.

BRIEF DESCRIPTION OF THE DRAWINGS

These and other features and advantages of the invention may be more completely understood from the following detailed description of the preferred embodiment of the invention with reference to the accompanying drawings in which.

DESCRIPTION OF THE PREFERRED EMBODIMENT

Figure 1:
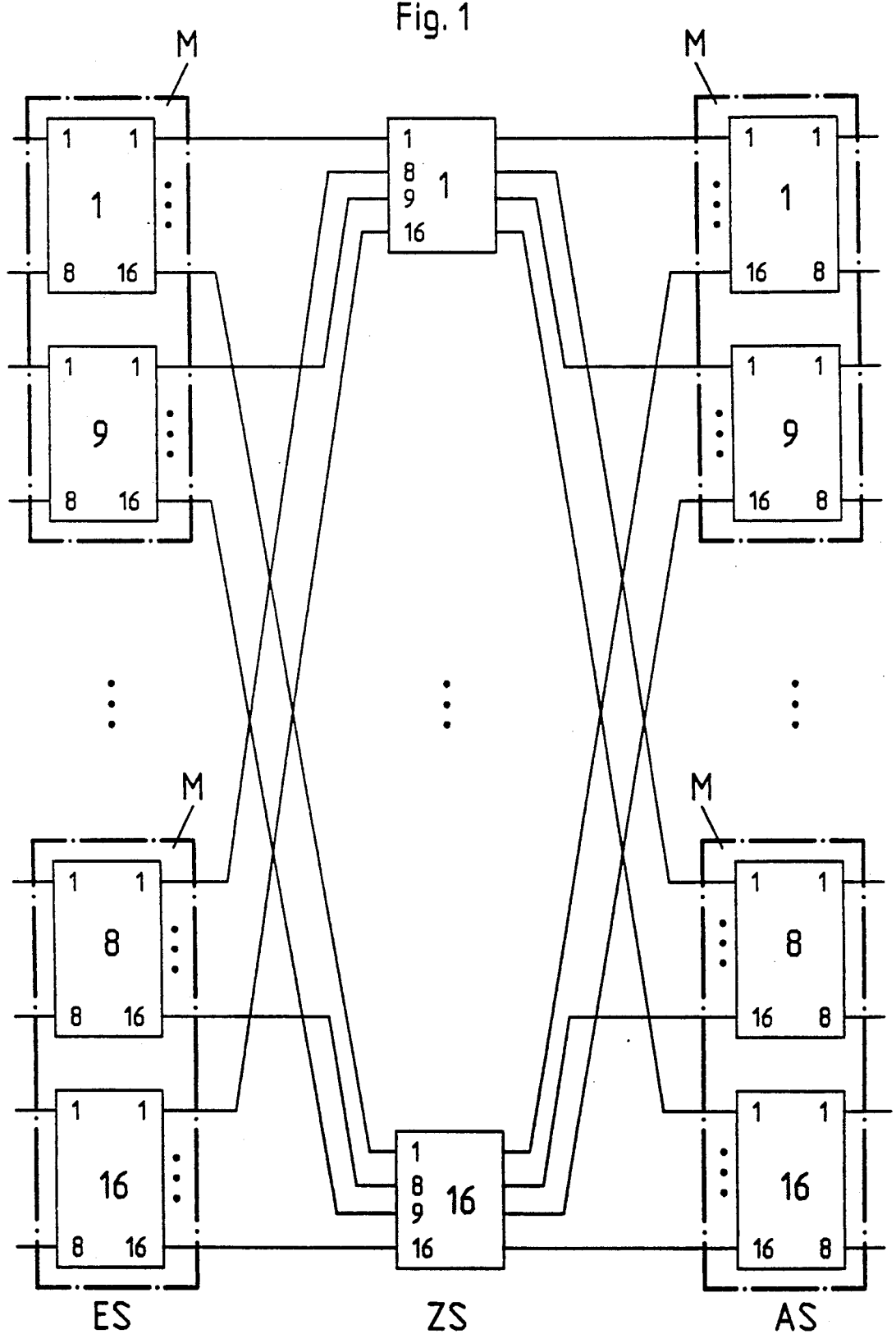
FIG. 1 is a block circuit diagram of a three-stage switching array before the combination of switching blocks in the first and third stages.

FIG. 1 illustrates the three-stage switching array before expansion. The exemplary embodiment provides for sixteen switching blocks (switching matrixes), $8 \times 16$ in size, in the first stage ES, and likewise sixteen switching blocks, $16 \times 8$ in size, in the third stage AS. In the second stage ZS sixteen switching blocks, $16 \times 16$ in size, are provided. In every switching block every input is connectable to every output. The switching array is configured in the regular manner. That is, the sixteen outputs of the first switching block of the first stage ES are respectively connected with the first input of the sixteen switching blocks of the second stage ZS, in the following sequence: the first output of switching block 1 of stage ES with the first input of switching block 1 of stage ZS, the second output of switching block 1 of stage ES with the first input of switching block 2 of stage ZS, etc. The connection paths from the switching blocks of the second stage to the switching blocks of the third stage are symmetrical to the connection paths from the switching blocks of the second stage to the switching blocks of the first stage.

As illustrated in FIG. 1, the switching blocks in each of the stages ES and AS are already disposed in pairs of adjacent switching blocks in modules M before the switching array is expanded. In this case, a module in the first (input) stage ES is a $16 \times 32$ switching block used to realize two $8 \times 16$ switching blocks. The same applies correspondingly for the third (output) stage AS. The three-stage switching array is non-blocking, i.e. via a well-defined connection path any desired input line of the first stage ES can be connected to any desired output line of the third stage AS. The switching array is also redundant with respect to the connection paths that can be switched through via the second stage ZS, since the second stage has one more switching block than is necessary for a Clos-type switching array (see Bell System Technical Journal, Vol. XXXII, 1953, pages 406–425, incorporated herein by reference). Thus, during operation of the array, connection paths can be alternately connected via this extra switching block to facilitate expansion while maintaining the switching array in a non-blocking state. Alternatively, non-required connection paths in other switching blocks in the second stage, or a combination of connection paths via the extra switching block and non-required connection paths in other switching blocks of the second stage, can be used as alternate connections during expansion.

Figure 2:
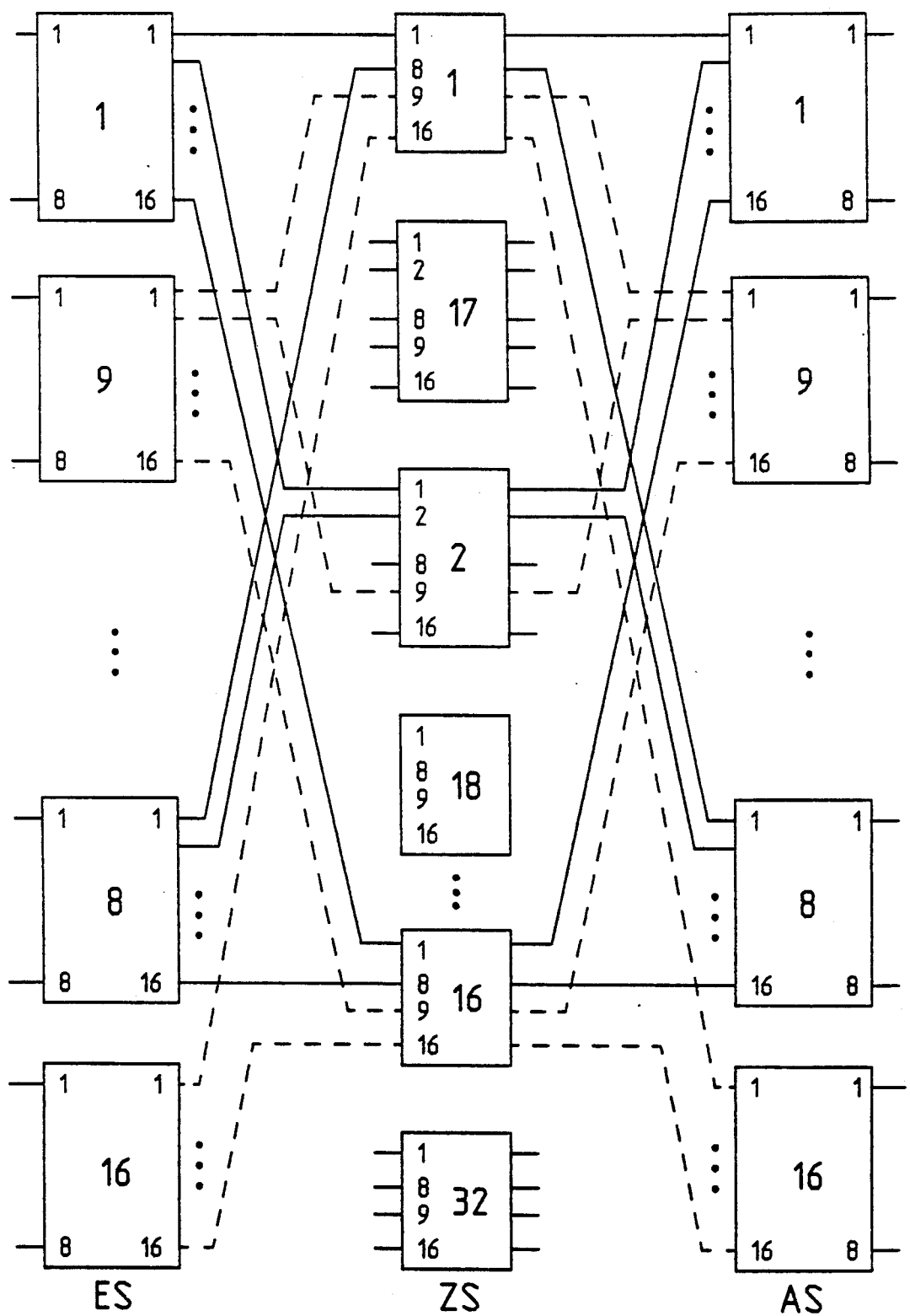
FIG. 2 is a block circuit diagram of the three-stage switching array following expansion of the second stage.

In one expansion step, additional switching blocks, switching blocks 17 to 32 in FIG. 2, are added to the second stage. The number of inputs in these additional switching blocks must be at least as great as the number of enlarged switching blocks in the first or third stage after completion of the expansion. In the illustrated embodiment the size $16 \times 16$ was selected for the additional switching blocks of the second stage, these having double the number of necessary inputs and outputs, so that with this number of inputs and outputs a much higher useful reserve results during expansion in the first and third stage.

In a further expansion step, the two $8 \times 16$ and $16 \times 8$ switching blocks of the first and third stages, respectively, accommodated in respective modules M are each combined to form larger switching blocks of a size $16 \times 32$ and $32 \times 16$, respectively. The combining is performed by conventional control means which change input/output coordination so that in the enlarged switching blocks, all 16 inputs are individually connectable with each of the 32 outputs thereof. For example, the enlarged switching block 1' (FIG. 3) is formed from the original switching blocks 1 and 9 (FIG. 2) in the respective first module of the first and third stages, and the enlarged switching block 8' is formed from the original switching blocks 8 and 16. Thus, eight new $16 \times 32$ switching blocks result in the first stage from the sixteen original $8 \times 16$ switching blocks. In the third stage eight new, enlarged, $32 \times 16$ switching blocks correspondingly result from the sixteen original $16 \times 8$ switching blocks.

The two smaller switching blocks disposed in each of the modules M of the first stage, having been easily combined into one larger switching block by means of different input/output associations, whereby the connection paths of the original switching block 1, which are occupying redundant connection paths are re-distributed in the second stage between the switching blocks 1 and 17. The same applies correspondingly for the remaining original switching blocks 2 to 16. Upon completion of the rerouting, the outputs 17 to 32 of each enlarged switching block in the first stage ES of the illustrated embodiment, which outputs previously lead to the original switching blocks of second stage ZS, are rerouted to the additional switching blocks 17 to 32.

FIG. 2 illustrates by dashed lines the connection paths to be rerouted prior to the re-distribution being performed. In order for this rerouting in the second stage to be carried out without causing possible impairment of ongoing operations, that is, in a non-blocking state, redundant paths for one switching block of the second stage are activated. For example, switching block 16, which provides redundant connection paths between the second stage and the switching blocks of the first and third stages, is activated. Upon completion of rerouting of the connections for an original switching block, use of the redundant connection paths or routes is discontinued and the routes to be used are switched back from these redundant routes to the inputs and outputs of the pair of original and new switching blocks for which the rerouting has been completed.

This alternate activation of redundant connection paths and switching back is repeated correspondingly in all other original switching blocks of the second stage ZS. In the example, eight connection paths between the first and second stages as well as the corresponding eight connection paths between the second and third stages are rerouted for each switching block in the second stage. Generally, to enlarge the switching blocks in the first and third stages, respectively, by a factor of dt, a fraction of the connection paths equal to $(dt-1)/dt$ must be rerouted from an original switching block in the second stage to the new switching block or blocks.

The sequence of the expansion, including the order in which the connection paths of the second stage are rerouted, can of course be varied. It is also possible, depending on requirements, to enlarge gradually (in steps) the additional switching blocks in the second stage.

Figure 3:
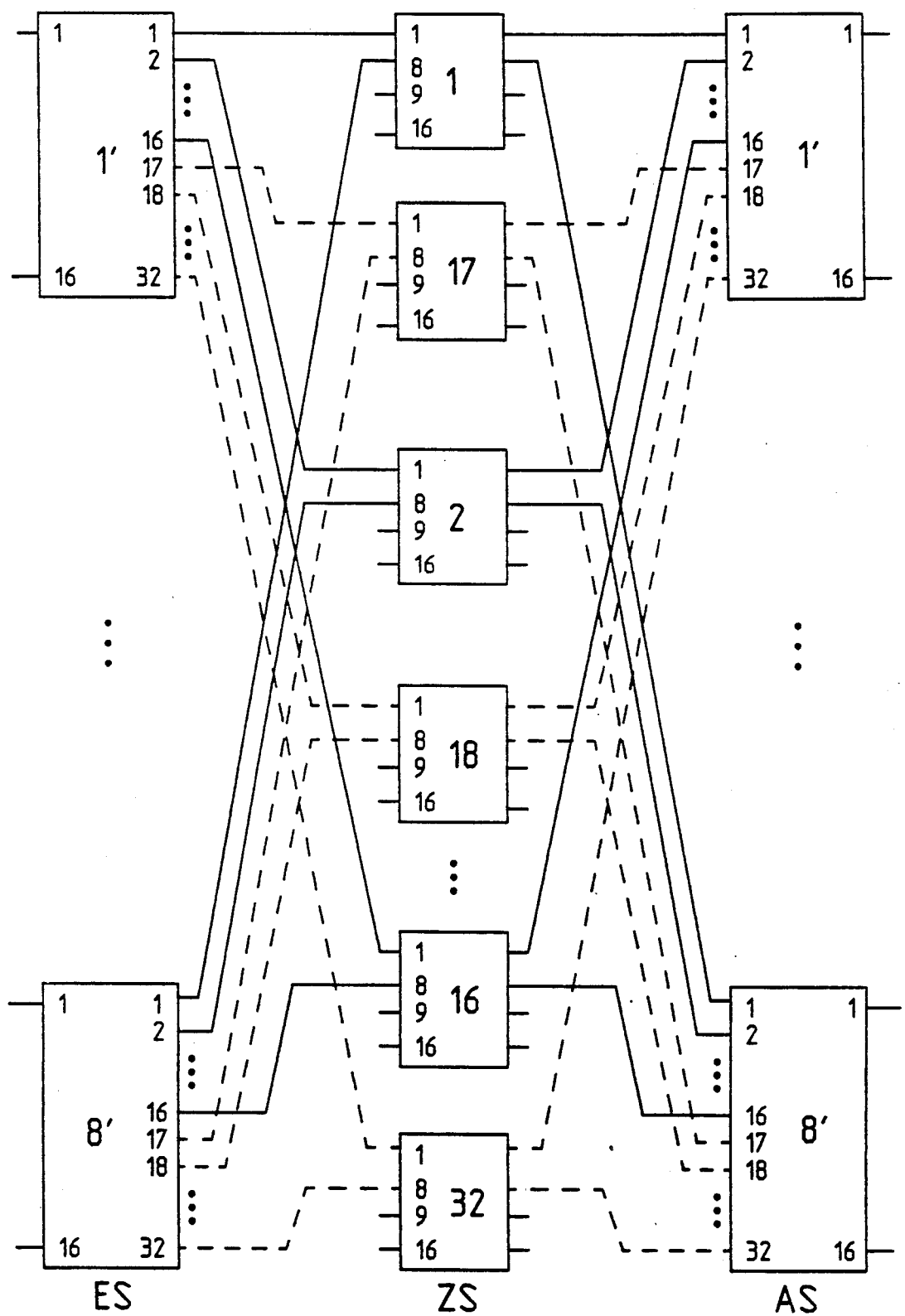
FIG. 3 is a block circuit diagram of the three-stage switching array following the formation of the enlarged switching blocks in the first and third stages and the rerouting of the connection paths.

FIG. 3 shows the switching array in a condition following rerouting of all connection paths to the additional switching arrays 17 to 32. The rerouted connection paths are shown by dashed lines. As can be seen from this figure, the inputs and outputs 9 to 16 of the original switching blocks of the second stage ZS are respectively rerouted to the inputs and outputs 1 to 8, respectively, of the additional 1o switching blocks of the second stage. Thus, after rerouting, the inputs and outputs 9 to 16 of both: the original and the added switching blocks of the second stage are free for the establishment of additional connection paths.

Figure 4:
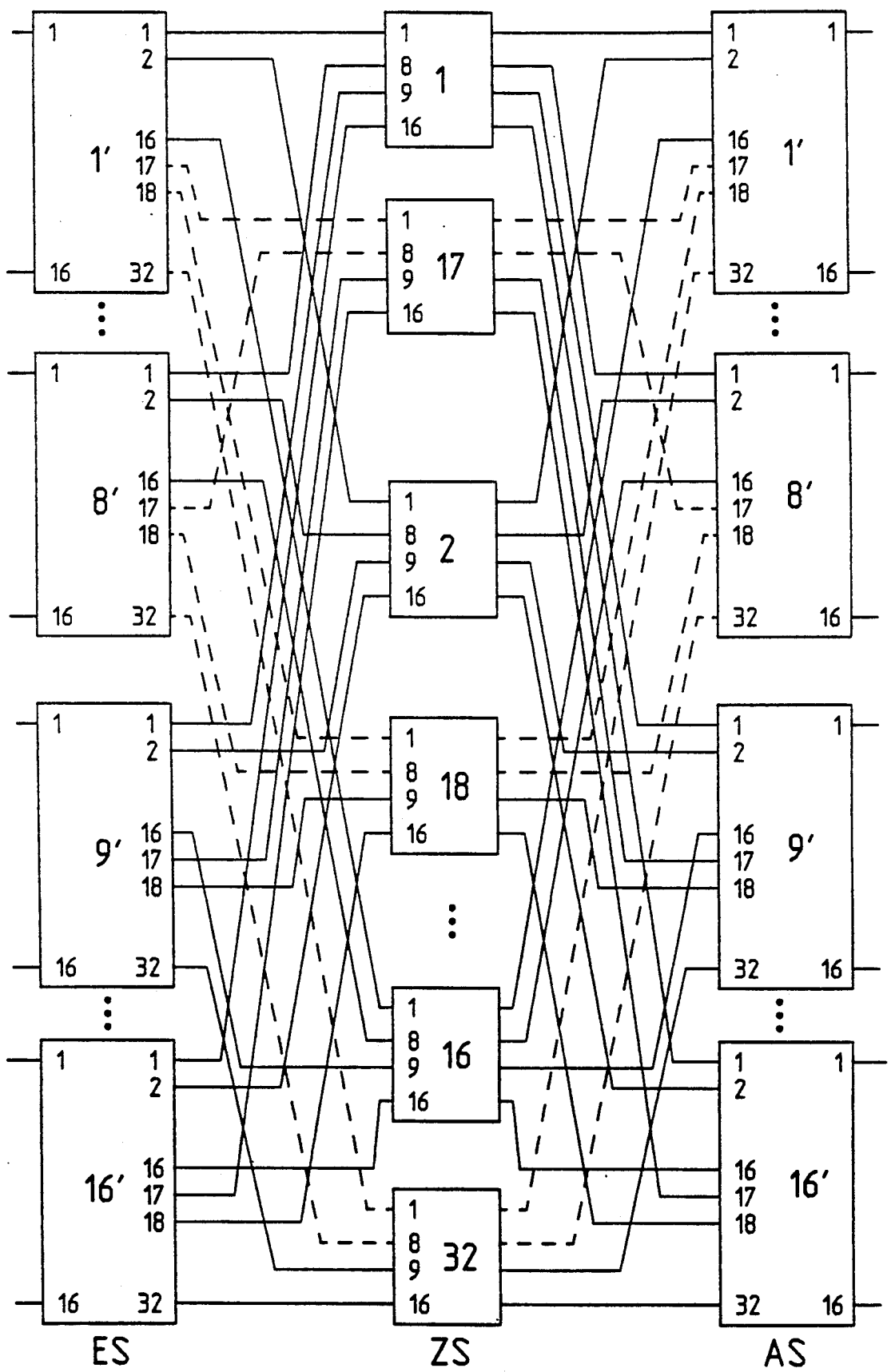
FIG. 4 is a block circuit diagram of the three-stage switching array upon completion of the expansion.

FIG. 4 shows a further expansion step. In this case, eight additional switching blocks 9 to 16 are added in the first stage and in the third stage. These blocks, like the enlarged switching blocks 1 to 8, are 16×32 switching blocks. The capacity of the additional 16×16 switching blocks of the second stage can be thus fully utilized.

Whereas the expansion was explained above on the basis of a concrete embodiment, the principle of the expansion is now set forth in general.

The first and third stages the switching array are composed respectively of (n×2n) and (2n×n) modules, where for example $n=2^j$, j being a positive integer. Any other value for n is possible. With $a=n/t$ (t=1,2 4,8, .. ., or n) an (n×2n) module is inserted in the first stage for each set of t (a×2a)-switching blocks. When the size of the switching blocks of the first stage is enlarged, the factor t, that is, the number of switching blocks per module, is reduced. With a reduction of t by factor dt (dt=2, 4, 8, . . . , or t), expansion is performed according to a process which includes the following steps:

(1) 2a·(dt−1) new switching blocks are provided in the second stage, these being the $(2a+1)^{th}$ to $(2a·dt)^{th}$ switching blocks;

(2) connections normally provided through the $k^{th}$ switching block of the second stage (k≦2a) are rerouted to redundant switching paths e.g. for one or more previously provided or newly provided switching blocks;

(3) the cables of the $k^{th}$ switching block are moved the $(2a·i+k)^{th}$ switching blocks (with i=1, 2, 3, . . . , dt−1); altogether, a total fraction of the cables of the $k^{th}$ switching block, equal to (dt−1)/dt, must be moved;

(4) new cables are connected to the $(2a·i+k)^{th}$ switching blocks (with i=0, 1, 2, 3, . . . , dt−1);

(5) the alternate connections put into use in step 2 above are switched back to the $(2a·i+k)^{th}$ switching blocks (for i=0, 1, 2, 3, . . . , dt−1);

(6) steps 2 to 5 are repeated for k=1, . . . , 2a.

Thus, in order to accommodate the increase in the size of the switching blocks in the first and third stages, new switching blocks are inserted in the second stage. After moving cables from the original switching blocks to the new switching blocks, new cables, which are connected to new modules in the first and third stages can then be inserted in the second stage at the now open original plug-in locations.

Figure 5:
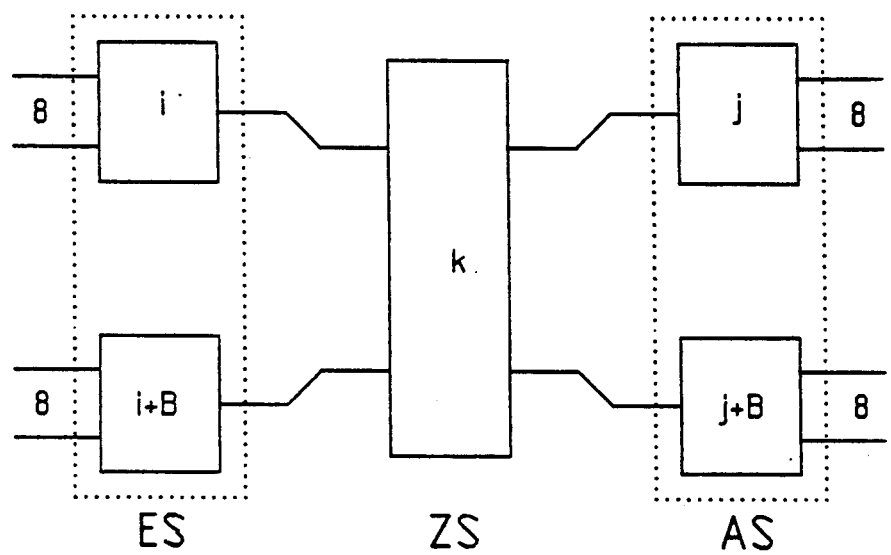
FIG. 5 is a block circuit diagram of the number of through-connections possible prior to expansion.
Figure 6:
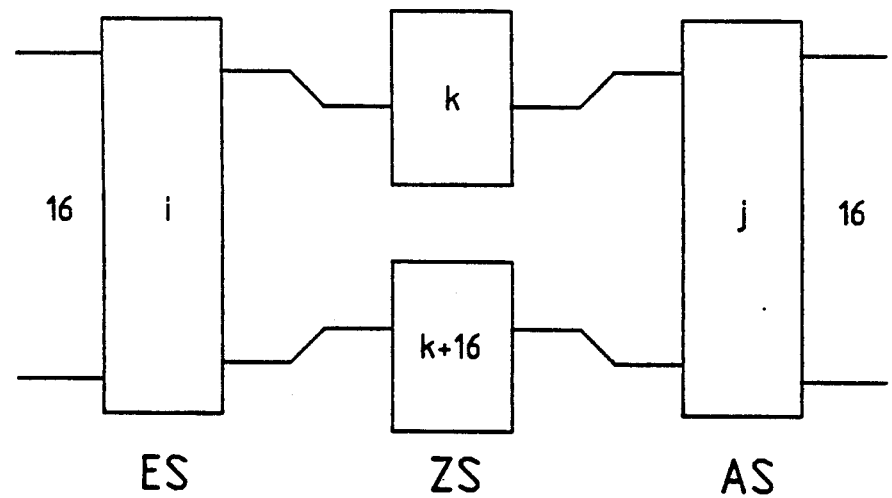
FIG. 6 is a block circuit diagram of the number of through-connections possible after expansion.

An example for t=2 and dt=2 can be found in FIGS. 5 and 6. In FIG. 5 is shown the number of through-connections for a single module in stage 1 prior to expansion; in FIG. 6 is shown the number of through-connections for the module after expansion. As can be seen from FIGS. 5 and 6, the number of possible through-connections remains the same.

It will be understood that the above description of the present invention is susceptible to various modifications, changes and adaptations, and the same are intended to be comprehended within the meaning and range of equivalents of the appended claims.

What is claimed is:

1. A method of expanding a non-blocking switching array having first, second and third stages, each stage including a plurality of original switching blocks, the method comprising the steps of:
    (a) forming a number of enlarged switching blocks in the first and third stages by combining groups of at least two original switching blocks in each of the first and third stages;
    (b) adding at least one additional switching block to the second stage, each additional switching block having a number of inputs which is equal to or greater than the number of enlarged switching blocks in the first stage;
    (c) activating redundant connection paths in the second stage to carry connections between the switching blocks in the first and third stages normally carried by a selected original switching block of the second stage;
    (d) rerouting a number of the connection paths between the selected original switching block of the second stage and switching blocks of the first and third stages to the at least one additional switching block with said number of rerouted connection paths equal to the difference between the number of original switching blocks in the first stage prior to said step (a) and the number of enlarged switching blocks in the first stage after said step (a);
    (e) after said step (d), activating the selected original switching block and the at least one additional switching block to switch back connections carried by the redundant connection paths following said step (c);
    (f) repeating said steps (c), (d) and (e) for the other original switching blocks of the second stage;
    (g) adding additional switching blocks to the first and third stages; and
    (h) connecting outputs of the additional switching blocks of the first stage and inputs of the additional switching blocks of the third stage, respectively with free inputs and outputs of the original and additional switching blocks of the second stage so as to form an expanded non-blocking switching array.

2. A method as in claim 1, wherein the groups of switching blocks of the first and third stages are disposed in respective modules prior to said step (a).

3. A method as claim 2, wherein each of the groups of additional switching blocks of the first and third stages are disposed in modules.

4. A method as in claim 1, wherein each of the groups of additional switching blocks of the first and third stages are disposed in modules.

5. A method as in claim 1, wherein the original switching blocks of the first, second and third stages prior to said step (a) include a non-blocking, Clos-type switching array with a redundant switching block in the second stage, and the redundant connection paths in the second stage activated during said step (c) include said redundant switching block.

6. A method as in claim 1, wherein the redundant connection paths in the second stage activated during said step (c) include non-required connections paths of one or more original switching blocks of the second stage.

7. A method as in claim 1, wherein the original switching blocks of the first, second and third stages prior to said step (a) include a redundant, non-blocking, Clos-type switching array including a redundant non-required switching block in the second stage to provide redundancy, some of the redundant connection paths in the second stage activated during said step (c) include the redundant switching block of the second stage, and other of the redundant connection paths in the second stage activated during said step (c) include non-required switching paths in an original switching block in the second stage.

8. A method as in claim 1, wherein the original blocks of the first, second and third stages before said step (a) includes a first non-blocking, Clos-type switching array, and the expanded non-blocking switching array formed in said step (h) includes a second non-blocking, Clos-type switching array which is larger than said first array.

* * * * *